US008724999B2

(12) United States Patent
Cvijetic et al.

(10) Patent No.: US 8,724,999 B2
(45) Date of Patent: May 13, 2014

(54) POLMUX-OFDM-DD TRANSMITTER AND RECEIVER FOR REDUCED COMPLEXITY AND OVERHEAD IN OPTICAL ACCESS/METRO TRANSMISSION

(75) Inventors: Neda Cvijetic, Plainsboro, NJ (US); Yue-Kai Huang, Princeton, NJ (US); Narayan Prasad, Wyncote, PA (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 103 days.

(21) Appl. No.: 13/446,306

(22) Filed: Apr. 13, 2012

(65) Prior Publication Data

US 2012/0263467 A1 Oct. 18, 2012

Related U.S. Application Data

(60) Provisional application No. 61/475,005, filed on Apr. 13, 2011.

(51) Int. Cl.
*H04J 14/02* (2006.01)
*H04B 10/00* (2013.01)
*H04B 10/04* (2006.01)
*H04B 10/12* (2006.01)
*H04B 10/06* (2006.01)

(52) U.S. Cl.
USPC ............. 398/82; 398/152; 398/184; 398/205; 398/207

(58) Field of Classification Search
USPC .......................................... 398/140, 152, 158
See application file for complete search history.

(56) References Cited

U.S. PATENT DOCUMENTS

| | | | |
|---|---|---|---|
| 2006/0109891 A1* | 5/2006 | Guo et al. | 375/147 |
| 2007/0133993 A1* | 6/2007 | Yee et al. | 398/85 |
| 2008/0199192 A1* | 8/2008 | Domagala | 398/208 |
| 2010/0086303 A1* | 4/2010 | Qian et al. | 398/65 |

OTHER PUBLICATIONS

Qian et al, 22.4-Gb/s OFDM Transmission over 1000 km SSMF using Polarization Multiplexing with Direct Detection (published in Conference on Optical Fiber Communication Mar. 2009).*

Schmidt et al, 100 Gbit/s Transmission using Single-Band Direct-Detection Optical OFDM (published in Conference on Optical Fiber Communication Mar. 2009).*

* cited by examiner

*Primary Examiner* — David Payne
*Assistant Examiner* — Casey Kretzer
(74) *Attorney, Agent, or Firm* — Joseph Kolodka

(57) ABSTRACT

An optical communication system includes a polarization multiplexed orthogonal frequency-division multiplexing POLMUX-OFDM transmitter for generating a POLMUX-OFDM double sideband signal, an optical processing path for processing the double sideband signal from the transmitter; an analog-to-digital convert ADC-OFDM receiver coupled to the optical processing path for receiving the double sideband signal processed by the optical path; and a block-diagonal multiple-input multiple-output MIMO equalizer responsive to the receiver for enabling correct operation for a completely random incoming signal polarization state without adaptive polarization control at said receiver, which enables complexity.

14 Claims, 2 Drawing Sheets

POLMUX-OFDM-DD TRANSMITTER AND RECEIVER FOR REDUCED COMPLEXITY AND OVERHEAD IN OPTICAL ACCESS/METRO TRANSMISSION

RELATED APPLICATION INFORMATION

This application claims priority to provisional application number 61/475,005 filed Apr. 13, 2011, the contents thereof are incorporated herein by reference

BACKGROUND OF THE INVENTION

The present invention relates generally to optical communications, and more particularly, to a POLMUX-OFDM-DD transmitter and receiver architecture for reduced complexity and overhead in Optical Access/Metro Transmission.

Polarization multiplexed (POLMUX) orthogonal frequency-division multiplexing (OFDM) transmission with direct detection (DD), abbreviated as POLMUX-OFDM-DD, has been shown to be a powerful technology which can achieve 40-100 Gb/s per wavelength transmission in next-generation optical access/metro networks. New transmitter and receiver side digital signal processing (DSP) algorithms have also been proposed to reduce implementation complexity in the electronic domain. However, novel transmitter and receiver side architectures that reduce optical component complexity have not yet been addressed. Moreover, new training sequence designs to reduce the training signal based overhead in these systems have likewise not been addressed.

In previous proposals, transmitter-side optical architectures have exploited advanced optical components such as multiple optical interleavers (ILs) to generate an optical single sideband POLMUX-OFDM signal and realize single-wavelength downstream transmission. For optical access/metro networks, this can be a costly transmitter side requirement.

On the receiver side, previous proposals have exploited optical filtering to reduce post-photodetection electronic DSP requirements. However, in so doing, the previous architectures can only work correctly for a limited set of incoming POLMUX-OFDM signal polarization states, which greatly limits their practical applicability in real systems where the incoming polarization can be completely random.

In terms of training sequence overhead, to the best of our knowledge, no new designs that reduce the high training-sequence based overhead have been proposed. This is an important problem because training sequences are the key requirement for receiver-side channel estimation which enables cross MCS.

Accordingly, there is a need for an improved POLMUX-OFDM-DD transmitter and receiver architecture for reduced complexity and overhead in Optical Access/Metro Transmission.

BRIEF SUMMARY OF THE INVENTION

The present invention is directed to an optical communication system including a polarization multiplexed orthogonal frequency-division multiplexing POLMUX-OFDM transmitter for generating a POLMUX-OFDM double sideband signal, an optical processing for processing the double sideband signal from the transmitter to generate a wavelength division multiplexed (WDM) POLMUX-OFDM single sideband signal; an optical processing receiver coupled to the optical processing path for receiving the single sideband POLMUX-OFDM signal processed by the optical path; and a computationally-efficient multiple-input multiple-output MIMO equalizer responsive to the receiver for enabling correct operation for a completely random incoming signal polarization state without adaptive polarization control at said receiver, which enables complexity and power consumption reduction.

These and other advantages of the invention will be apparent to those of ordinary skill in the art by reference to the following detailed description and the accompanying drawings.

DETAILED DESCRIPTION

The present invention is directed to a simplification of the transmitter-side optical architecture by exploiting a simple differential phase shift keying (DPSK) demodulator instead of a costly optical interleaver (IL) to generate the required POLMUX-OFDM signal. Moreover, the proposed invention uses an optical filter, either an IL or waveshaper, in a way that enables WDM POLMUX-OFDM single sideband transmission, rather than being restricted to single-wavelength transmission, as was the case previously.

On the receiver-side, the proposed invention exploits optical filtering and block-diagonal multiple input multiple output (MIMO) processing to enable correct operation with a completely random incoming POLMUX-OFDM signal polarization state, rather than being restricted to a small subset of polarization states, or requiring adaptive polarization control, as was the case in previous proposals.

In terms of training sequence overhead, the proposed invention presents a new design wherein a conventional training sequence set made up of four separate sequences is replaced with a training sequence set that requires only two separate sequences. With the new design, training sequence overhead is reduced by 50%.

Figure 1:
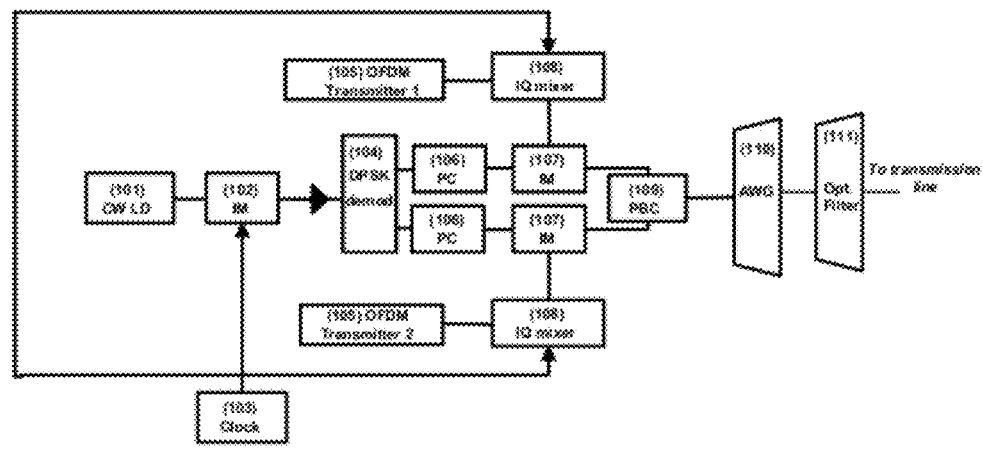
FIG. 1 depicts a POLMUX-OFDM transmitter configuration, in accordance with the invention.

The inventive POLMUX-OFDM transmitter-side configuration is shown in FIG. 1. The innovative aspects are blocks (104), (110) and (111). The configuration operates as follows: first, two un-modulated optical carrier signals are generated by the continuous wave laser diode (CW LD) of (101), a radio frequency (RF) clock source (103) and an optical intensity modulator (102). Next, the two optical carriers are separated by a differential phase shift keying (DPSK) demodulator (104), which is different from prior art, where this step was done with an optical interleaver (IL). Using a simple DPSK demodulator (104) instead reduces optical component cost, and enables frequency flexibility because, unlike with an IL, the optical carriers no longer have to be aligned to the ITU grid. Moreover, a DC-voltage controlled phase shifter in the DPSK demodulator (104) can be used to optimally align the carrier peaks, such that there is no performance degradation in this step. After blocks (105), (106), (107), (108), and (109) generate a POLMUX-OFDM signal, an array of parallel POLMUX-OFDM transmitters (100) operating on different wavelengths and an arrayed wave guide grating (AWG) in (110) are used to generate a WDM comb of POLMUX-OFDM signals, and enable WDM-based operation. Finally, an optical filter (111), which can be an optical interleaver or an optical waveshaper, is used to generate an optical single sideband (OSSB) WDM-POLMUX-OFDM signal. Unlike in prior art, the costly optical filter is now shared between many wavelengths, reducing cost without sacrificing performance.

Figure 2:
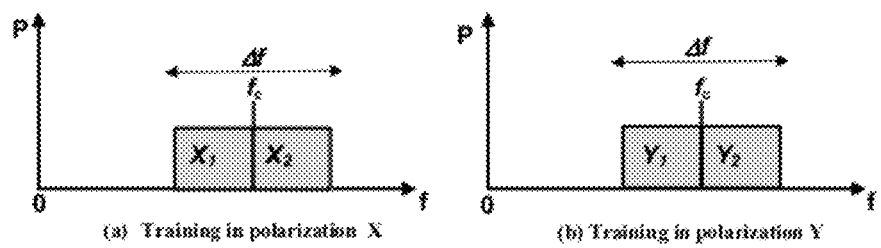
FIG. 2 depicts POLMUX-OFDM training sequence configuration, in accordance with the invention.

The inventive POLMUX-OFDM entails a training sequence shown in FIG. 2. In conventional systems, a complete training sequence consisted of four parts with non-overlapping frequency content, denoted by $X_1, X_2, Y_1, Y_2$ in FIG. 2. The four parts were sent sequentially in time to avoid possible cross-polarization interference. Thus, four full signaling intervals were needed to convey a complete training sequence set. In the proposed design, due to receiver-side optical filtering, training symbols in a given polarization can now simultaneously occupy the full frequency range $\Delta f$, such that training sequences $X_1$ and $X_2$ can be merged together in one signaling slot, and training sequences $Y_1$ and $Y_2$ can also be combined in one signaling slot. Thus, in the proposed design, a complete training sequence consists of $(X_1+X_2)$, $(Y_1+Y_2)$, sent sequentially in time. The new design now occupies only two full signaling intervals, instead of four, as in prior art, reducing training overhead by 50%. The extra signaling intervals can now be used for data symbol transmission, and increase the data throughput compared to designs hereto before.

Figure 3:
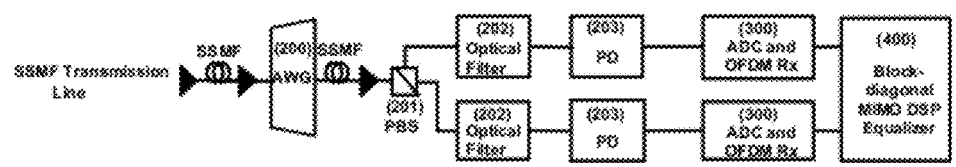
FIG. 3 depicts a POLMUX-OFDM transmitter configuration, in accordance with the invention.

The inventive POLMUX-OFDM direct detection receiver aspect is shown in FIG. 3. The new and different portions of the receiver are the AWG (200), the optical filters (202) and the block-diagonal MIMO DSP equalizer (400). The transmission line is composed of standard single mode fiber (SSMF), optical amplifiers, an AWG (200) to recover one wavelength from the WDM comb of wavelengths generated by (110) in FIG. 1, and in the case of optical access, passive optical splitters. Following transmission, a POLMUX-OFDM signal with an arbitrary incoming polarization state is divided into two orthogonal polarization components by a polarization beam splitter (PBS) in (201). The PBS outputs are next input to two receiver-side optical filters (202), which remove the polarization-rotated optical carrier component that would cause significant cross-polarization interference at the photodetector (PD) output.

Depending on the specific application, the optical filters (202) can be implemented via DPSK demodulators, fiber bragg gratings (FBGs), optical interleavers (IL), or waveshapers. Following photodetection (203), each PD output is digitized with an analog-to-digital converter (ADC) and processed in an OFDM receiver (Rx) in (300), according to well-known prior methods. Finally, the outputs of (300) are input to the block-diagonal MIMO DSP equalizer (400).

The MIMO DSP equalizer (400) first processes the training sequences of FIG. 2 to extract the channel estimation matrix and classify it as either having a block-diagonal form or fully-diagonal form. This classification can be done by computing a metric from the channel estimation metric and comparing it with a threshold value. If the channel is classified as block-diagonal, the OFDM data symbol pair $(S_{X,i}$ and $S_{Y,N-i+1})$ can be optimally processed independently of the data symbol pair $(S_{Y,i}$ and $S_{X,N-i+1})$, and vice versa, where the notation $S_{X/Y,i}$ denotes the OFDM symbol in polarization X/Y on OFDM subcarrier i, and the notation $S_{X/Y,N-i+1}$ denotes the OFDM symbol in polarization X/Y on OFDM subcarrier N−i+1, where N denotes the Fast Fourier Transform (FFT) size. Optimal 2×2 block-diagonal MIMO processing can be performed as previously described in our work on this topic. If the channel is classified as fully diagonal, all four symbols mentioned above can be equalized independently via diagonal ZF. To identify the channel as fully diagonal, the following metric computation can be used: we denote the 4×4 channel estimation matrix by H, $$H = \begin{bmatrix} H_1 & 0 \\ 0 & H_2 \end{bmatrix},$$

where 0 denotes a 2×2 all-zeros matrix and $H_1$ and $H_2$ are arbitrary 2×2 matrices. We next observe that if the receiver-side state of polarization (SOP) is such that the off-diagonal elements of $H_1$ and $H_2$ are sufficiently small, H will further simplify to a fully diagonal matrix, with a negligible effect on equalization performance. The switching rule metric can thus measure the ratio of the diagonal to off-diagonal elements in $H_1$ and $H_2$ and compare this with a threshold to decide between non- and 2×2 MIMO processing. Namely, letting $$H_1^{*T} H_1 = \begin{bmatrix} p & q \\ r & s \end{bmatrix},$$

where *T denotes the conjugate transpose, the switching metric can be defined for the OFDM subcarrier pair $(S_{X,i}, S_{Y,i})$ as:

$$\gamma(i) = \frac{p+s}{p+s+|q|+|r|} = \frac{p+s}{p+s+2|r|}$$

In the above relationship, the first equality recognizes that p and s will always be real numbers, while the second exploits the fact that $|q|=|r|$ for all q, r. An analogous expression, $\gamma(N-i+1)$, follows from $H_2$, with the final metric, $\gamma$, obtained by averaging across OFDM subcarriers. A BER threshold can then be used to determine the optimal $\gamma$ value, and in this way capture both SOP and variable QAM size effects on performance.

Unlike in prior art, the use of optical filtering (203) combined with the block-diagonal MIMO processing (400) enables correct operation for a completely random incoming signal polarization state without adaptive polarization control at the receiver, which enables significant complexity reduction compared to previous solutions. Moreover, channel estimate classification based on the channel metric enables switching between the 2×2 MIMO and the computationally simpler diagonal ZF, which reduces overall computational complexity and power consumption.

Figure 4:
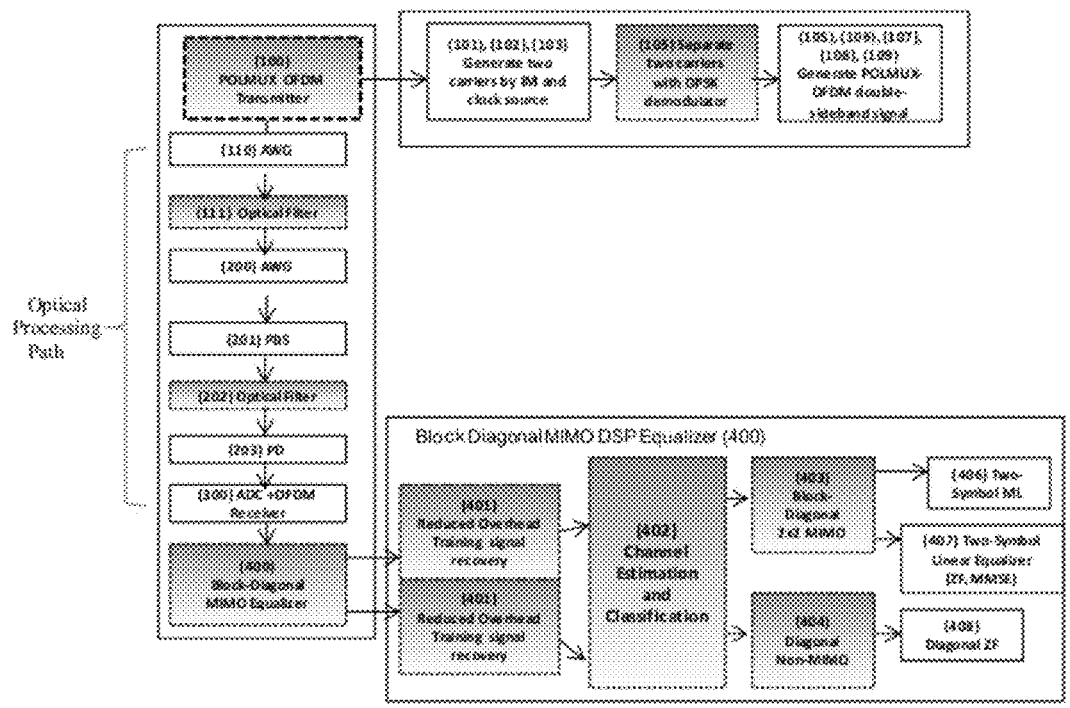
FIG. 4 is a block diagram indicating key aspects of the inventive POLMUX-OFDM system, in accordance with the invention.

Referring now to the block diagram of FIG. 4, operative aspects of the inventive POLMUX-OFDM are denoted by the shaded, dashed rectangles. These include a POLMUX-OFDM transmitter configuration, wherein the key features are optical carrier separation using a DPSK demodulator (105), and optical single sideband filtering of a WDM-POLMUX-OFDM signal using an optical filter (111). A receiver-side configuration is also presented, wherein the key features are optical filtering for removal of polarization-rotated optical carriers (202), reduced overhead training signal design and recovery (401) and new channel estimation and classification (402) which enables 1.) correct operation for an arbitrary incoming polarization state without adaptive receiver-side polarization control; 2.) switching between robust 2×2 MIMO (403) and computationally simpler diagonal (non- MIMO) ZF (404) based on the value of a switching metric computed in (402) to reduce computational complexity and power consumption.

Key feature (105) enables a much more cost-effective way to separate optical carriers in order to generate an optical POLMUX-OFDM signal. Feature (111) enables a cost-efficient way to generate optical single sideband POLMUX-OFDM signal for an entire WDM comb of signals, such that the filter cost can be shared among all wavelengths and increased transmission capacity can be achieved. Optical filters at the receiver (202) and the channel estimation and classification (402) enable correct equalizer operation for an arbitrary incoming polarization state of the POLMUX-OFDM signal, without adaptive polarization control, which was not the case in prior art. Moreover, unlike in prior art, (402) enables switching between robust 2×2 MIMO equalization and computationally simple diagonal (non-MIMO) ZF, as shown by (403) and (404), based on the value of a switching metric computed in (402), which reduces complexity and power consumption while maintaining the required performance. Finally, feature (401) exploits the new training sequence design to enable the block diagonal channel estimation (402) with reduced overhead, such that 50% fewer signaling intervals are used for training and can be used for data symbols instead, increasing the transmission rate compared to prior art.

From the foregoing it can be appreciated that the competitive value of the new transmitter side architecture is lower cost and higher capacity operation, since simplified optical components are used and WDM-OFDM transmission is enabled. On the receiver side, the proposed solution reduces complexity because it maintains high performance for an arbitrary rather than restricted incoming signal polarization state, without requiring complex adaptive polarization control. Finally, the new training sequence design enables faster operation because it reduces the training signal overhead by 50%, such that more data symbols can be sent in a given time, instead of using the signaling intervals to send training (i.e. non-data) symbols.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. For example, those of ordinary skill in the art will recognize that multiple configurations for the optical processing path shown in FIG. 4 are possible to achieve the same signal transformation effect. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An optical communication system comprising:
a polarization multiplexed orthogonal frequency-division multiplexing POLMUX-OFDM transmitter for generating a POLMUX-OFDM double sideband signal;
an optical processing for processing the double sideband signal from the transmitter to generate a wavelength division multiplexed (WDM) POLMUX-OFDM single sideband signal;
an optical processing receiver coupled to the said optical processing path for receiving the single sideband POLMUX-OFDM signal processed by the said optical path; and
a computationally-efficient block-diagonal multiple-input multiple-output MIMO equalizer responsive to the receiver for enabling correct operation for a completely random incoming signal polarization state without adaptive polarization control at said receiver, which enables complexity and power consumption reduction;
wherein receiver side optical processing in the form of parallel polarization-orthogonal optical filters is used for removal of polarization-rotated optical carriers.

2. The system of claim 1 wherein said transmitter comprises separating two carriers with a differential phase shift key DPSK demodulator prior to said generating a POLMUX-OFDM double sideband signal.

3. The system of claim 1 wherein optical processing in the form of an optical filter is used for optical single sideband filtering of a WDM-POLMUX-OFDM signal.

4. The system of claim 1, wherein said block-diagonal MIMO equalizer comprises a reduced overhead training signal recovery.

5. The system of claim 4, wherein said block-diagonal MIMO equalizer comprises a channel estimation and classification responsive to said reduced overhead training signal recovery.

6. The system of claim 5, wherein said block-diagonal MIMO equalizer comprises a diagonal non-MIMO function, responsive to said channel estimation and classification.

7. The system of claim 6, wherein said block-diagonal MIMO equalizer comprises a diagonal zero forcing ZF responsive to said diagonal non-MIMO function.

8. The system of claim 5, wherein said block-diagonal MIMO equalizer comprises a block diagonal 2×2 MIMO function, responsive to said channel estimation and classification.

9. The system of claim 8, wherein said block-diagonal MIMO equalizer comprises a two symbol linear equalizer and a two symbol maximum likelihood ML responsive to said block-diagonal 2×2 MIMO function.

10. The system of claim 4, wherein said channel classification as fully diagonal comprises use of a metric computation where there is denoted a 4×4 channel estimation matrix by H, $$H = \begin{bmatrix} H_1 & 0 \\ 0 & H_2 \end{bmatrix},$$

where 0 denotes a 2×2 all-zeros matrix and $H_1$ and $H_2$ are arbitrary 2×2 matrices, wherein if the receiver-side state of polarization (SOP) is such that the off-diagonal elements of $H_1$ and $H_2$ are sufficiently small, H will further simplify to a fully diagonal matrix, with a negligible effect on equalization performance.

11. The system of claim 4, wherein said reduced overhead training signal recovery exploits a new training sequence configuration to enable a block diagonal channel estimation with reduced overhead, such that 50% fewer signaling intervals are used for training and can be used for data symbols instead, thereby increasing the transmission rate.

12. The system of claim 1, wherein said block-diagonal MIMO equalizer comprises processing training sequences to extract a channel estimation matrix and classify it as either having a block-diagonal form or a full-diagonal form.

13. The system of claim 12, wherein said classify comprises computing a metric from a channel estimation metric and comparing it with a threshold value where if a channel is classified as said block-diagonal then an OFDM data symbol pair $S_{X,i}$ and $S_{Y,N-i+1}$ can be optimally processed independently of a second data sysmbol pair $S_{Y,i}$ and $S_{X,N-i+1}$ and vice versa, where where the notation $S_{X/Y,i}$ denotes the OFDM symbol in polarization X/Y on OFDM subcarrier i, and the notation $S_{X/Y,N-i+1}$ denotes the OFDM symbol in polarization X/Y on OFDM subcarrier N−i+1, where N denotes the Fast Fourier Transform (FFT) size.

14. The system of claim 12, wherein said classify comprises computing a metric from a channel estimation metric and comparing it with a threshold value where if a channel is classified as fully diagonal, all four data symbol pairs $S_{X,i}$ and $S_{Y,N-i+1}$, $S_{Y,i}$ and $S_{X,N-i+1}$ can be equalized independently via a diagonal zero forcing ZF.

\* \* \* \* \*